US012656807B2

(12) United States Patent
Spurrier et al.

(10) Patent No.: US 12,656,807 B2
(45) Date of Patent: Jun. 16, 2026

(54) BACKLIT KNOB

(71) Applicant: Electrolux Consumer Products, Inc.,
Charlotte, NC (US)

(72) Inventors: Alexander Spurrier, Charlotte, NC
(US); Xiuwen Zhang, Hangzhou (CN);
Heng Cao, Hangzhou (CN); **Claudio
Guzzo**, Castel Bolognese (IT);
Zhengqian Lin, Hangzhou (CN); **Chris
Burch, Portland, OR (US); Chris
Neranjan**, Goodletsville, TN (US);
Timothy Brown, Springfield, TN (US)

(73) Assignee: Electrolux Home Products, Inc.,
Charlotte, NC (US)

( * ) Notice: Subject to any disclaimer, the term of this
patent is extended or adjusted under 35
U.S.C. 154(b) by 1285 days.

(21) Appl. No.: 17/071,080

(22) Filed: Oct. 15, 2020

(65) Prior Publication Data

US 2021/0141410 A1     May 13, 2021

Related U.S. Application Data

(60) Provisional application No. 62/915,148, filed on Oct.
15, 2019.

(51) Int. Cl.
*G05G 1/10*          (2006.01)
*F21V 8/00*          (2006.01)
(Continued)

(52) U.S. Cl.
CPC .............. *G05G 1/105* (2013.01); *F24C 7/085*
(2013.01); *G02B 6/0008* (2013.01); ***H01H
19/025*** (2013.01)

(58) Field of Classification Search
CPC ..... H01H 19/025; G02B 6/0008; F24C 7/085;
G05G 1/105
See application file for complete search history.

(56) References Cited

U.S. PATENT DOCUMENTS 5,464,955 A  *  11/1995  Cole ........................ D06F 34/32
                                                    200/312
6,627,828 B1 *   9/2003  McCartney ............. F24C 3/124
                                                    200/61.86
(Continued)

FOREIGN PATENT DOCUMENTS

CN          201016484          2/2008
CN          201396823          2/2010
(Continued)

OTHER PUBLICATIONS

Backlit Precision Knobs: https://www.mieleusa.com/domestic/2992.
htm?info=200071558-ZPV.

*Primary Examiner* — Arman B Fallahkhair
(74) *Attorney, Agent, or Firm* — Pearne & Gordon LLP

(57) ABSTRACT

A knob assembly for operating a heating element for cook-
ing food includes a user-engageable knob having a light
guide. The knob assembly also includes a first housing and
a second housing. The first housing encloses a first switch
adapted to operate the heating element, and the second
housing encloses a light switch and a light source. The light
switch is adapted to operate the light source to illuminate the
knob. A rotatable stem is operatively coupled to the first
switch, the light switch, and the knob. The knob is thus
adapted to operate the first switch and the light switch via
rotation thereof. The first housing is longitudinally stacked
behind and attached to the second housing such that the stem
extends at least partially through the first housing and the
second housing. The knob is affixed to an end of the stem
that protrudes forward from the second housing.

17 Claims, 15 Drawing Sheets

(51) Int. Cl.
    *F24C 7/08*         (2006.01)
    *H01H 19/02*      (2006.01)

(56)         References Cited

U.S. PATENT DOCUMENTS

| | | | |
|---|---|---|---|
| 8,979,289 B2 | 3/2015 | Camli et al. | |
| 9,146,033 B2 * | 9/2015 | Cadima | F24C 7/082 |
| 10,022,014 B2 | 7/2018 | Mateos Martin et al. | |
| 10,276,316 B2 | 4/2019 | Turner et al. | |
| 10,281,154 B2 | 5/2019 | Yantis | |
| 10,310,541 B2 * | 6/2019 | Gur | H01H 19/14 |
| 10,330,324 B2 | 6/2019 | Bach | |
| 10,409,314 B2 | 9/2019 | Turner et al. | |
| 10,458,656 B2 * | 10/2019 | Jung | F24C 3/008 |
| 10,465,915 B2 | 11/2019 | Bach | |
| 10,890,331 B2 * | 1/2021 | Kim | G05G 1/105 |
| 11,073,289 B2 * | 7/2021 | Lee | F24C 15/322 |
| 2010/0216080 A1 * | 8/2010 | Home | F24C 3/126 |
| | | | 431/13 |
| 2018/0045419 A1 | 2/2018 | Kim | |
| 2018/0259190 A1 | 9/2018 | Furuti et al. | |
| 2019/0346874 A1 * | 11/2019 | Ceylan | G05G 1/105 |

FOREIGN PATENT DOCUMENTS

| | | |
|---|---|---|
| CN | 201718133 | 1/2011 |
| CN | 208459895 | 2/2019 |
| DE | 2627976 | 1/1978 |
| DE | 2741492 | 3/1979 |
| DE | 3900737 | 7/1990 |
| DE | 4204499 | 8/1993 |
| DE | 29519025 | 1/1996 |
| DE | 19539081 | 4/1997 |
| DE | 19819433 | 9/1999 |
| DE | 10207547 | 9/2003 |
| DE | 10236935 | 2/2004 |
| DE | 102007019517 | 10/2008 |
| EP | 0777327 | 6/1997 |
| EP | 1401000 | 3/2004 |
| EP | 1536181 | 6/2005 |
| EP | 1914779 | 4/2008 |
| EP | 2442335 | 4/2012 |
| EP | 2913736 | 9/2015 |
| EP | 2924534 | 9/2015 |
| EP | 2980486 | 2/2016 |
| WO | 2014102384 | 7/2014 |

* cited by examiner

420

421

471

423

471
470

422

422a

429

427

421

423

424

428

425

426

450

451
460
452
469    453

BACKLIT KNOB

BACKGROUND

Cooking appliances with heating elements, such as ranges with cooktop burners, can have knob assemblies that actuate the heating elements. When a user is in close proximity to a knob, it can be easy to determine when the knob is rotated to an 'ON' position such that the heating element is emitting heat. However, when there are multiple knobs or if a user is farther away from appliance, it can be more difficult to determine at a glance whether the knob has been rotated from the 'OFF' position.

SUMMARY

The following presents a simplified summary in order to provide a basic understanding of the embodiments described herein. This summary is not an extensive overview nor is it intended to identify key or critical elements. Its sole purpose is to present some concepts in a simplified form as a prelude to the more detailed description that is presented later.

In a first exemplary embodiment, a knob assembly includes a user-engageable knob having a light guide. The knob assembly also includes a first housing and a second housing. The first housing encloses a first switch adapted to operate a heating element for cooking food, and the second housing encloses a light switch and a light source. The light switch is adapted to operate the light source to illuminate the knob. A rotatable stem is operatively coupled to the first switch, the light switch, and the knob. The knob is thus adapted to operate the first switch and the light switch via rotation thereof. The first housing is longitudinally stacked behind and attached to the second housing such that the stem extends at least partially through the first housing and the second housing. The knob is affixed to an end of the stem that protrudes forward from the second housing.

In a second exemplary embodiment, a knob assembly is configured to operate a gas heating element. The knob assembly includes a user-engageable knob having a light guide. The knob is rotatable between an off position and a plurality of on positions including an ignition position. A gas valve is adapted to deliver gas to the heating element. A valve stem extends from the valve and is operable to adjust a flow of gas through the valve for delivery to the gas heating element. The knob is affixed to and rotatable with an end of the valve stem. A first housing is disposed longitudinally in front of the gas valve. The first housing encloses an ignitor switch that includes an ignitor cam that is keyed to and rotates with the valve stem. The ignitor cam has a lobe that deflects a first ignitor-switch contact to close a circuit with a second ignitor-switch contact in order to deliver power to an ignitor for igniting the flow of gas at the gas heating element when the knob is rotated to the ignition position. A second housing is disposed longitudinally in front of the first housing. The second encloses a light switch and a light source. The light switch includes a lighting cam that is keyed to and rotates with the valve stem. The lighting cam has a lobe that deflects a first light-switch contact to close a circuit with a second light-switch contact in order to energize the light source to illuminate the light guide of the knob whenever the knob is rotated out of the off position.

In a third exemplary embodiment, a knob assembly is configured to operate an electric heating element. The knob assembly includes a user-engageable knob having a light guide. The knob is rotatable between an off position and a plurality of on positions. The knob assembly also includes a first housing that encloses an electric infinite switch or a potentiometer having a switch stem extending therefrom. The knob is affixed to and rotatable with an end of the switch stem to adjust a flow of electrical current through the infinite switch or potentiometer to the electric heating element when the knob is rotated from an off position. A second housing is disposed longitudinally in front of the first housing. The second encloses a light switch and a light source. The light switch includes a lighting cam that is keyed to and rotates with the switch stem. The lighting cam has a lobe that deflects a first light-switch contact to close a circuit with a second light-switch contact in order to energize the light source to illuminate the light guide of the knob whenever the knob is rotated out of the off position.

BRIEF DESCRIPTION OF FIGURES

Throughout the drawings and the detailed description, unless otherwise described, the same drawing reference numerals can be understood to refer to the same elements, features, and structures. The relative size and depiction of these elements may be exaggerated for clarity, illustration, and convenience.

DETAILED DESCRIPTION

Figure 1:
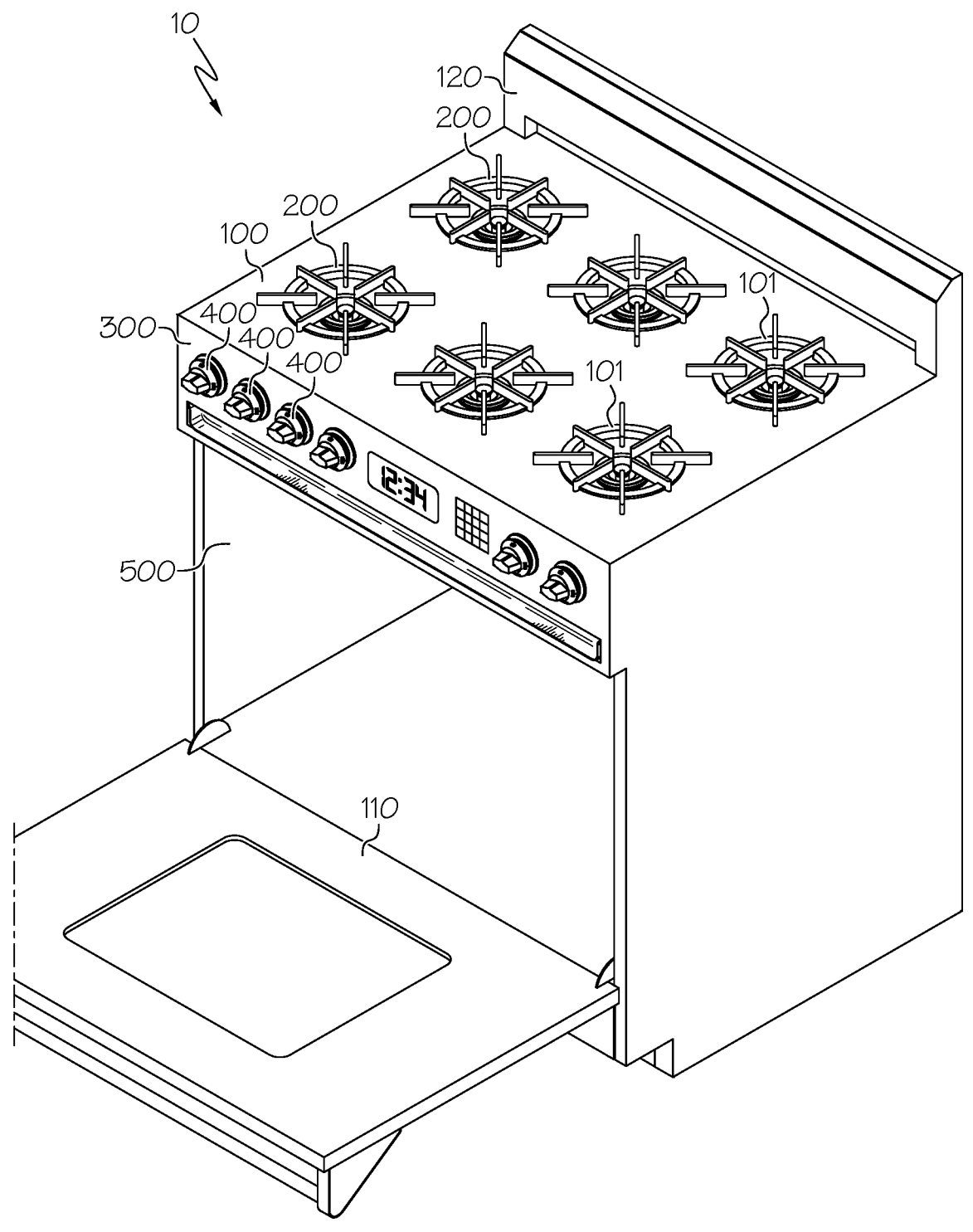
FIG. 1 depicts a cooking appliance according to a first example.

Example embodiments are described and illustrated herein. These illustrated examples are not intended to be a limitation on the present embodiments. For example, one or more aspects of the embodiments of knob assemblies disclosed herein, as well as the knobs that can be used therewith, can be utilized in other embodiments and other types of appliances. Example embodiments will be described more fully hereinafter with reference to the accompanying drawings. Like, but not necessarily the same, elements in the various figures are denoted by like reference numerals for consistency. Terms such as "first," "second," "front," and "rear" are used merely to distinguish one component (or part of a component or state of a component) from another. Such terms are not intended to denote a preference or a particular orientation.

Referring to FIG. 1, a cooking appliance 10 according to a first example is illustrated. The cooking appliance 10 has a cooktop 100 with a plurality of heating elements 200 as well as a cooking cavity 500 closed via a door 110. As depicted in this embodiment, the heating elements 200 are gas-powered heating elements, e.g. gas burners, but can alternatively be heated with alternative means, such as electric power. The cooktop includes a grate 101 above each heating element 200 on which a cooking container can be placed in order to be heated by the heating element. The heating elements 200 are controlled by knob assemblies 400 disposed on a control panel 300. The control panel 300 is located on the front face of the appliance 10 above the cooking cavity 500/door 110 as depicted. However, in alternative embodiments, the control panel 300 can be disposed on an upwardly extending back wall 120 of the appliance 10; i.e. a conventional rear-control appliance as known in the art.

Figure 2A:
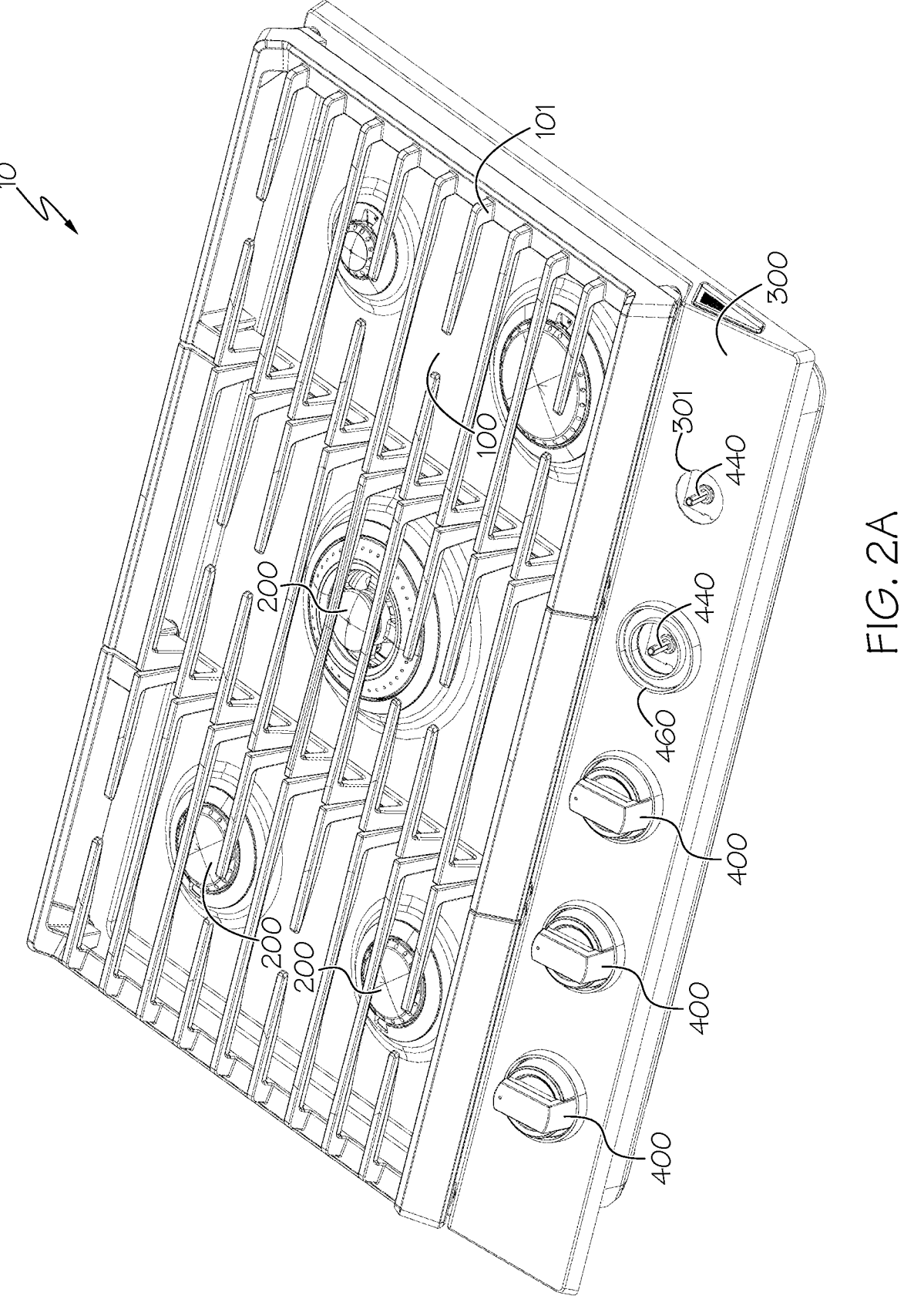
FIG. 2A depicts a cooking appliance according to a second example.

Referring to FIG. 2A, a cooking appliance 10 according to a second example is illustrated. The cooking appliance 10 also has a cooktop 100 with a plurality of heating elements 200 depicted as gas-powered heating elements, e.g. gas burners. The cooktop 100 includes a common grate 101 raised above a plurality (e.g. all) the heating elements 200 such that cooking container can be placed on the grate 101 above a respective heating element in order to facilitate cooking. The cooktop 100 includes a control panel 300 at the front of the appliance forward of the grate 101 having a plurality of knob assemblies 400 corresponding to the heating elements 200. Two of the knob assemblies 400 are partially removed, such that stems 440 of the respective knob assemblies, discussed in greater detail below, can be seen. The stems 440 can be seen extending through respective openings 301 in the control panel 300. The bezel 460 of one of these knob assemblies 400 is depicted and is discussed in greater detail below.

Figure 2B:
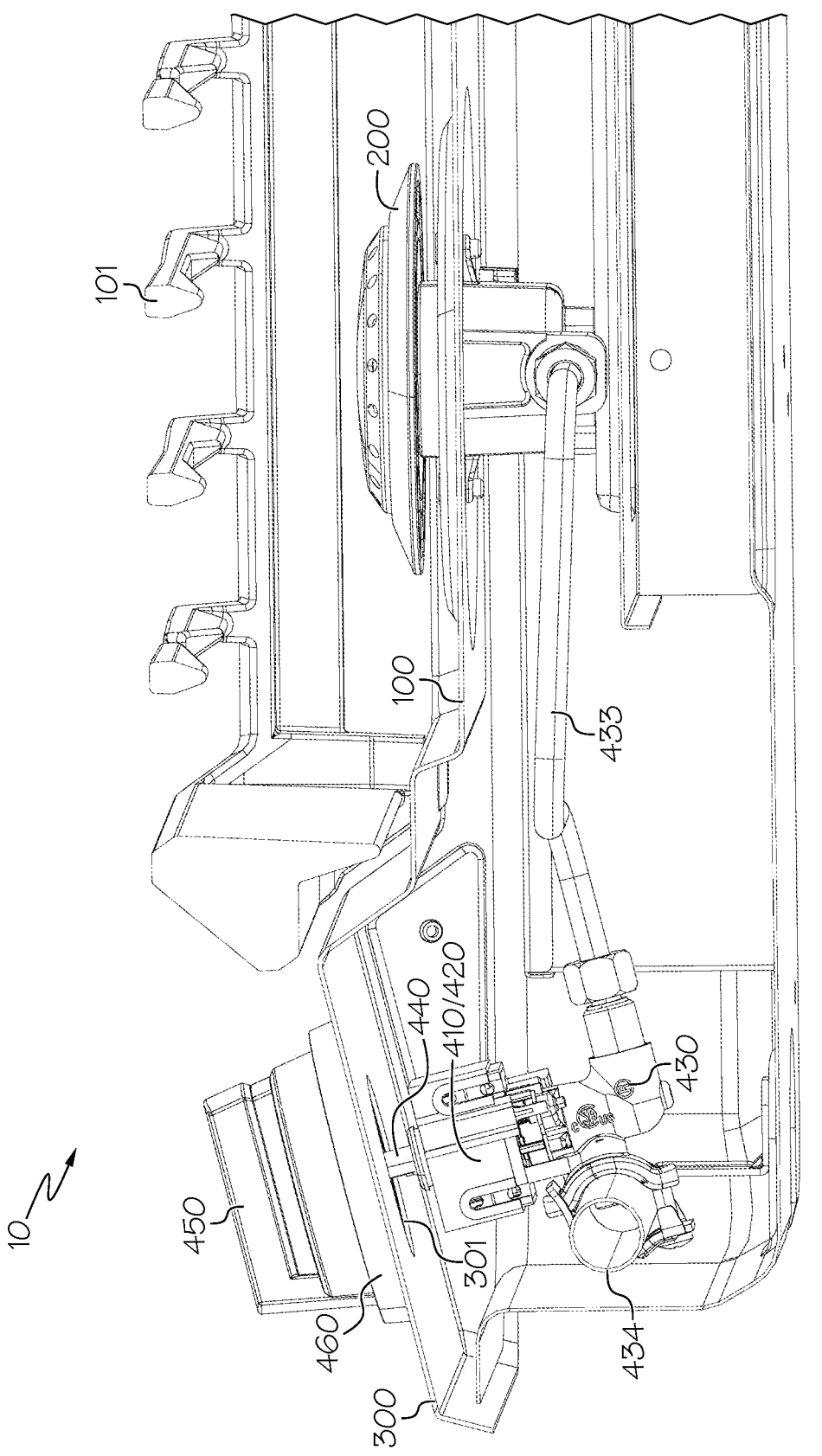
FIG. 2B depicts a side cross-sectional view of cooking appliance of FIG. 2A.

Referring to FIG. 2B, the cooking appliance 10 according to the second example is illustrated partially in section such that inner components of the appliance and connections therebetween can be viewed. As can be seen, an exemplary knob assembly 400 includes outer components positioned above the control panel 300, including a knob 450 and a bezel 460, which are discussed in greater detail below. The knob 450 is connected to the stem 440 of the associated knob assembly 400, which extends through the opening 301 in the control panel 300. The knob assembly also includes inner components positioned below the control panel 300, including a pair of housings 410, 420, and is connected to a gas valve 430 in the illustrated embodiment, all of which are discussed in greater detail below. The gas valve 430 has an inlet connected to a gas-feed pipe 433 and an outlet connected to a gas-delivery pipe 434, which is connected to the gas heating element 200 to supply gas thereto for combustion.

Figure 3A:
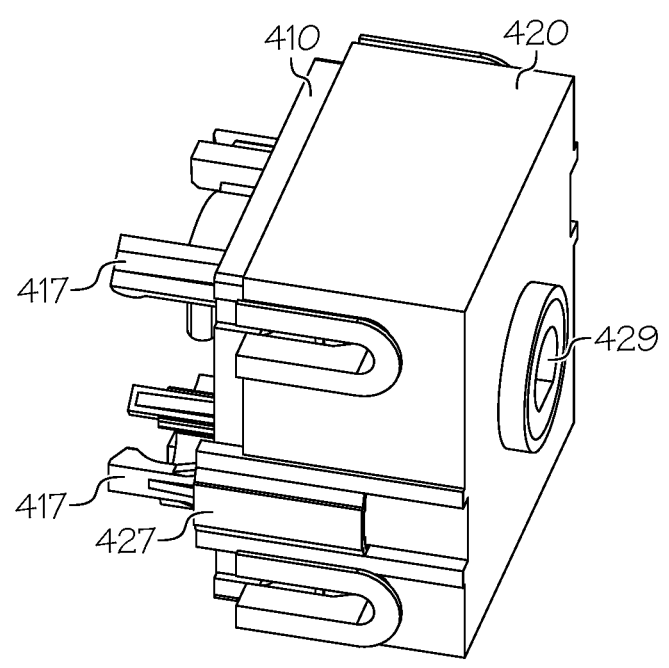
FIG. 3A depicts a pair of housings for a knob assembly in an assembled state according to a first embodiment.
Figure 3B:
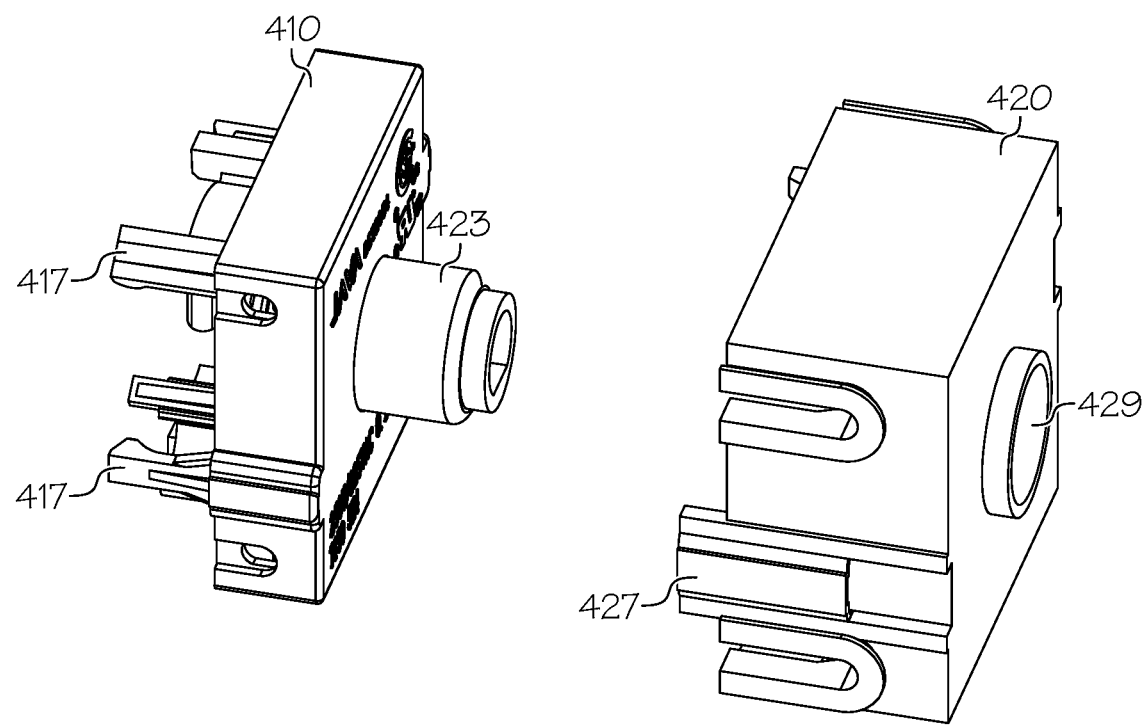
FIG. 3B depicts an exploded view of the housings of FIG. 3A.

Referring to FIGS. 3A, 3B, 4A, 4B, 5A and 5B, details of inner components of the knob assembly 400 according to a first embodiment are illustrated. FIGS. 3A-3B depict a first housing 410 ignitor-switch housing and a second housing 420. In the instant embodiment the first housing 410 is an ignitor-switch housing and the second housing 420 is a light-switch housing. The ignitor-switch housing 410 is configured to be partially received within a base of the top portion 422 of the light-switch housing 420, stacked beneath the bottom portion 421 of the light-switch housing 420 (described more fully below). The ignitor-switch housing 410 has arms 417 extending longitudinally from its bottom portion 411, which assist in attaching it to a gas valve 430. The lighting-switch housing 420 also has arms 427 extending longitudinally from lateral walls of its top portion 422, which are configured to slide over the ignitor-switch housing 410 as it is being advanced within the top portion 422 of the light-switch housing 420 from beneath, such that the arms 427 engage with complementary structure on the ignitor housing 410 to secure the housings 410 and 420 to one another when coupled together.

Figure 4A:
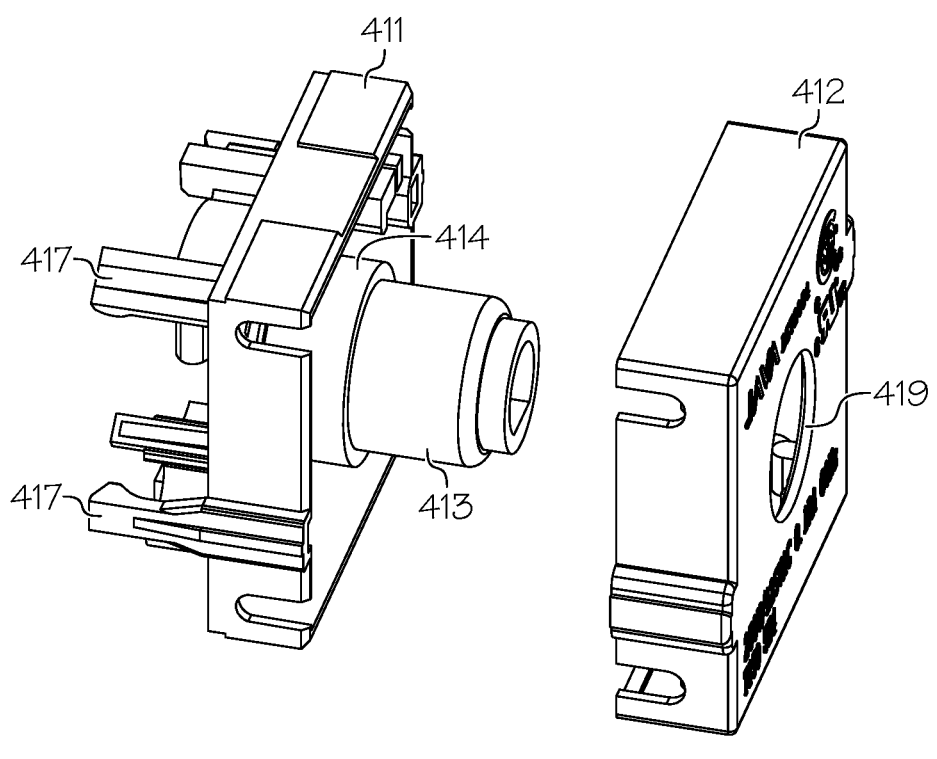
FIG. 4A depicts an exploded view of the first housing of FIG. 3A, showing a base and cap thereof.
Figure 4B:
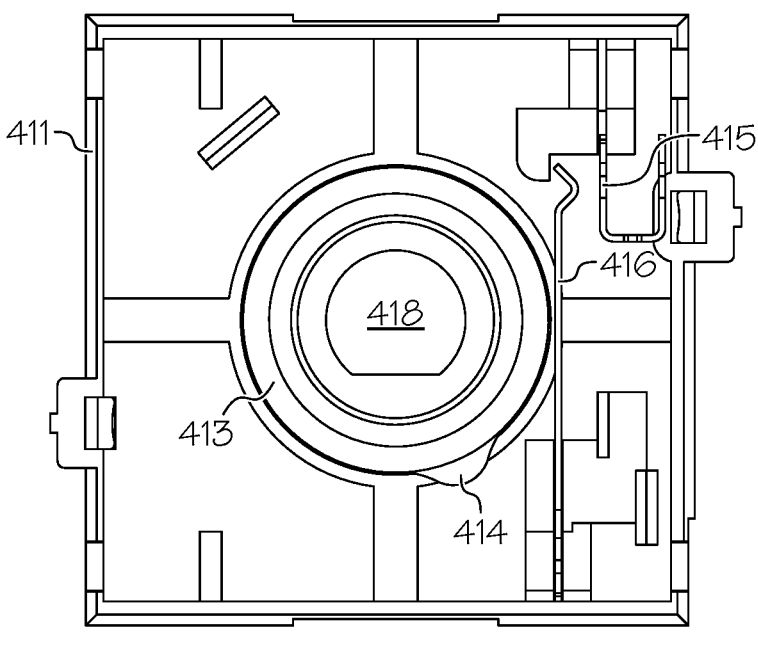
FIG. 4B depicts a top view of the base of the first housing of FIG. 4A.

Referring to FIGS. 4A-4B, the ignitor-switch housing 410 according to the first embodiment is shown in detail. It includes a bottom portion 411 and a top portion 412 defining an enclosed space. An ignitor switch is housed inside the enclosed space and includes a cam 413 having a lobe 414 as well as a pair of electrical contacts 415, 416. The cam 413 has an opening 418 configured to receive the stem 440 such that it is fixed in rotation therewith. The opening 418 is keyed to match the shape of the stem 440 such that rotation thereof results in rotation of the cam 413. The first contact 415 of the two electrical contacts is fixed in place and can be connected via wiring (not shown) to an ignitor (not shown) that ignites gas at the heating element 200. The second contact 416 of the two contacts is movable between a first position (shown in FIG. 4B) and a second position (not shown) and is connected to a power source (not shown) via wiring (not shown). In alternative embodiments, the first contact 415 can be connected to a power source whereas the second contact 415 can be connected to an ignitor. In the first position shown in FIG. 4B, the second contact 416 is spaced from the first contact 415 such that they are not in contact with one another. The second contact 416 is biased to the first position absent an external force. In the second position, the second contact 416 is deflected into contact with the first contact 415 such that an electrical connection is established between the power source to the ignitor.

The lobe 414 is positioned such that upon rotation of the cam 413 into a preselected rotational orientation, the lobe 414 deflects the second contact 416 to move it from the first position to the second position in order to establish the electrical connection between the contacts. As discussed in greater detail below, this electrical connection results in the ignitor creating a spark that ignites gas flowing at the heating element 200. The lobe 414 is configured such that it only deflects the second contact 416 in this manner within a small angular window corresponding to an 'ignition' position of the valve stem 440. Thus, when the stem 440 and thus cam 413 are rotated into the 'ignition' position, the lobe 414 is caused to deflect the second contact 416 to move it to the second position to establish the electrical connection between the two contacts. Once ignition is achieved, the stem 440 and cam 413 are rotated out of the 'ignition' position, and thus the lobe 414 ceases to deflect the second contact 416 whereby the bias thereof results in returning to the first position.

As will be appreciated, the ignitor switch is disposed within the ignitor-switch housing 410 (i.e. within the space defined between the upper and lower portions 412 and 411 thereof), which can be supplied as a pre-manufactured component integrating such an ignitor switch as described.

Figures 5A, 5B:
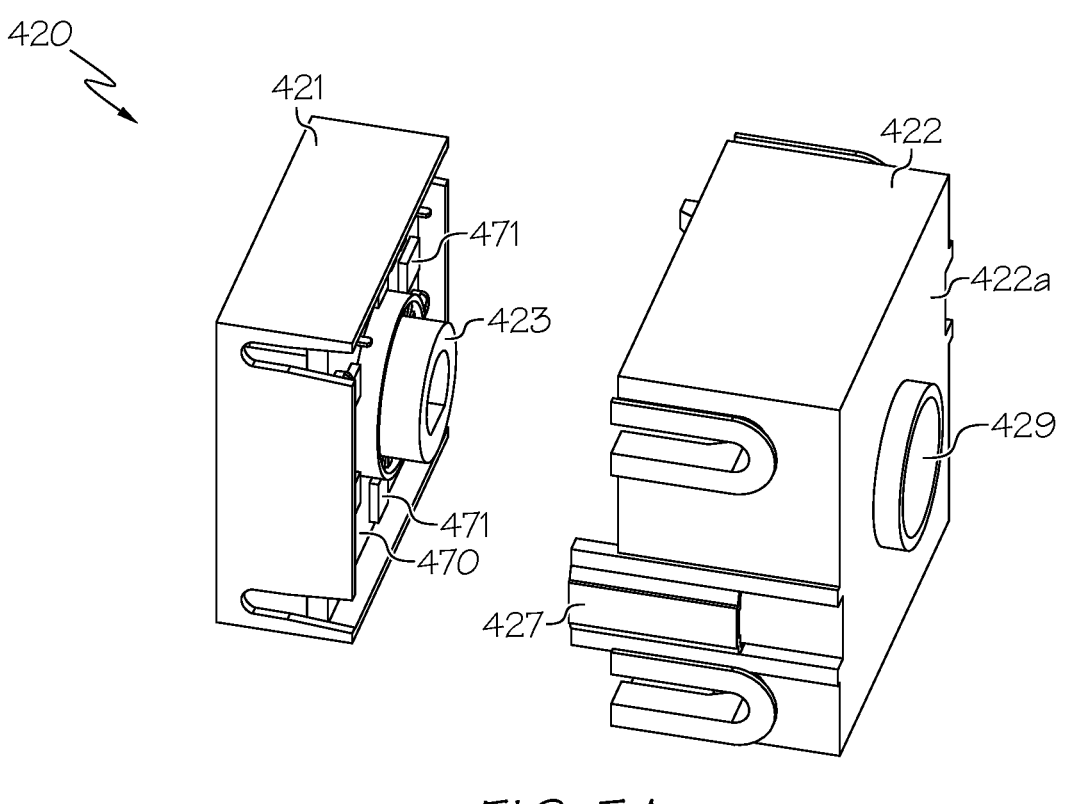
FIG. 5A depicts an exploded view of the second housing of FIG. 3A, showing a base and a cap thereof.
FIG. 5B depicts a top view of the base of the second housing of FIG. 5A.

Referring to FIGS. 5A-5B, the light-switch housing 420 according to the first embodiment is shown in detail. It includes a bottom portion 421 and a top portion 422 defining an enclosed space. A light switch is housed inside the enclosed space and includes a cam 423 having a lobe 424 as well as a pair of electrical contacts 425, 426. The cam 423 has an opening 428 configured to receive the stem 440 such that it is fixed in rotation therewith. The opening 428 is keyed to match the shape of the stem 440 such that rotation thereof results in rotation of the cam 423. Also housed within the light-switch housing 420 is a printed circuit board 470 having a plurality of light sources 471, e.g. LEDs (removed in FIG. 5B so that the other components of inside the housing can be viewed). The top surface 422a of the top portion 422 is transparent or translucent such that light illuminating from the light sources 471 can pass therethrough. The first contact 425 of the two contacts is fixed in place and can be connected via wiring (not shown) to the light sources 471 on the printed circuit board 470. The second contact 426 of the two contacts is movable between a first position (shown in FIG. 5B) and a second position (not shown) and can be connected via wiring (not shown) to a power source (not shown). In alternative embodiments, the first contact 425 can be connected to a power source whereas the second contact 426 can be connected to the light sources 471 on the printed circuit board 470. In the first position shown in FIG. 5B, the second contact 426 is spaced from the first contact 425 such that they are not in contact with one another. The second contact 426 is biased to the first position absent an external force. In the second position, the second contact 426 is in contact with the first contact 425, such that an electrical connection is established between the power source and the light sources 471 on the printed circuit board 470. The lobe 424 is positioned such that upon rotation of the cam 423, the lobe 424 deflects the second contact 426 to move it from the first position to the second position to establish the electrical connection between the contacts. As discussed in greater detail below, this electrical connection results in the light sources 471 on the printed circuit board 470 be powered such that they are illuminated and emit light. In contrast to the lobe 414 of the ignitor switch discussed above, the lobe 424 of the light switch is configured such that deflects the second contact 426 throughout a large angular window corresponding to any of a plurality of 'ON' or 'OPEN' (in the case of a gas valve) positions for the valve stem 440, as further discussed in greater detail below.

Figures 6A, 6B:
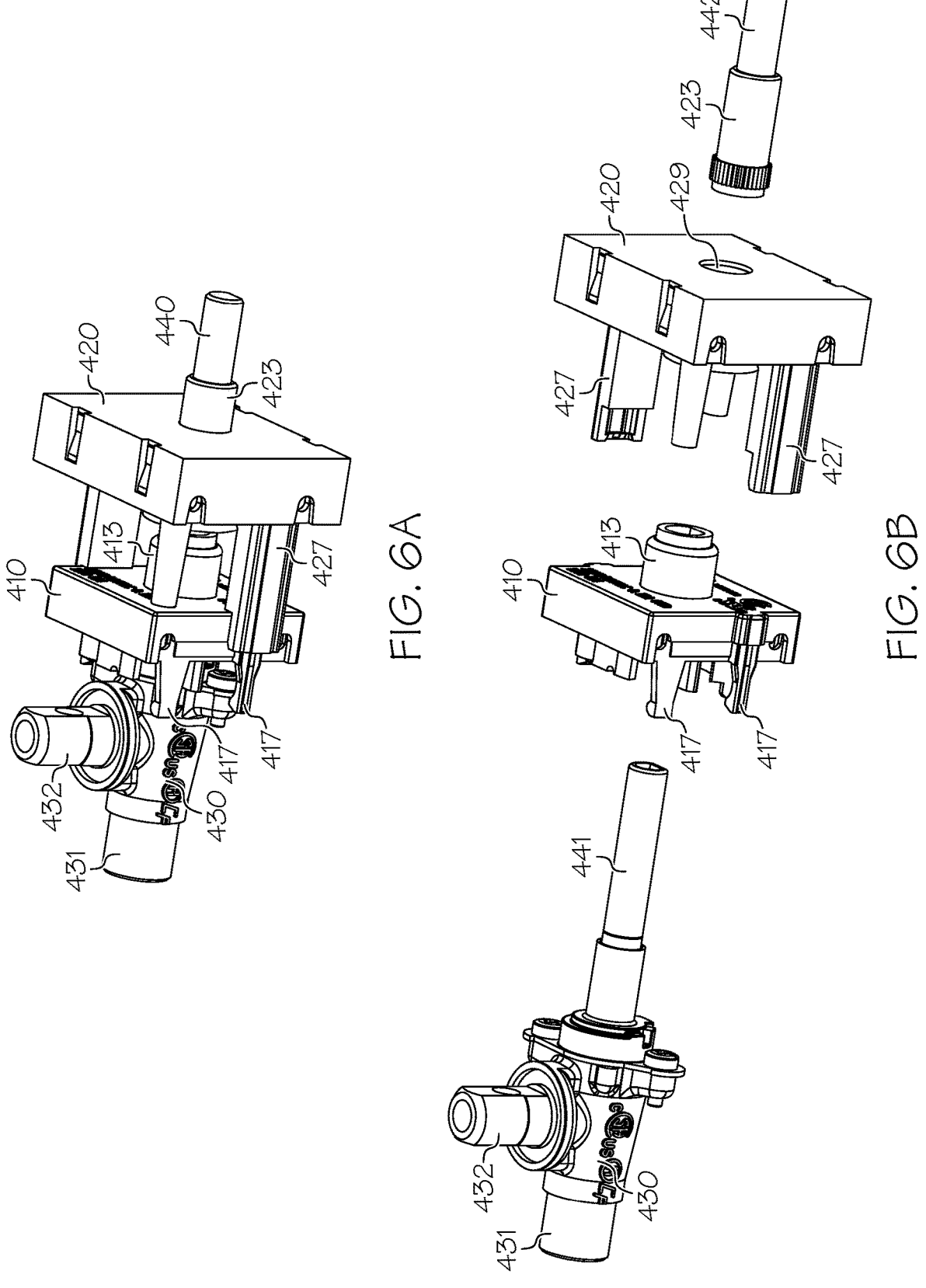
FIG. 6A depicts a knob assembly having a pair of housings according to a second embodiment coupled to a gas valve assembly in an assembled condition.
FIG. 6B depicts an exploded view of the knob assembly and gas valve assembly of FIG. 6A.

Referring to FIGS. 6A-6B, inner components of a knob assembly 400 according to a second embodiment are shown. The knob assembly 400 in this embodiment includes an ignitor-switch housing 410, a light-switch housing 420, a gas valve assembly 430, and a valve stem 440, all similar to the embodiment previously described. However, in this embodiment the valve stem 440 may benefit from a modest extension in order to accommodate gas valves that may need to be mounted a greater distance beneath the control-panel surface than the length of the valve stem 440; or at least far enough beneath the control-panel surface that the length of that stem 440 is not sufficient to reach through both housings 410 and 420 when the knob assembly 400 is mounted at the control panel. Accordingly, in this embodiment the stem 440 includes a first portion 441 extending from the gas valve 430 and through the ignitor-switch housing 410. This first portion 441 is the native valve stem that is incorporated as part of the gas valve 430. A second portion 442 of the stem 440 is attached to the first portion 441 thereof and extends out of a top opening 429 in the light-switch housing 420. Thus the second portion 442 is essential an extension of the native valve stem 440 for the gas valve, increasing its effective length. The second portion 442 has a socket at its proximal end that is keyed to the shape of the first portion 441 in order that they can be rotationally affixed together so they will rotate in unison. Similarly, the second portion 442 has a distal end that is keyed similarly, preferably the same, as the shape of the first portion 441, so that it can be keyed to cooperating structure (e.g. the cam of the light switch and ultimately the knob that will be affixed above the control panel). In this manner, the second portion 442 acts together with and as an extension of the first portion 441 to operate the valve 430, the ignitor switch and the light switch all based on user inputs from the knob above.

The gas valve 430 includes an inlet 431 configured to be connected to the gas-feed pipe 433, and an outlet 432 configured to be connected to the gas-delivery pipe 434. The gas valve 430 is configured to move between a 'CLOSED' position and a plurality of 'OPEN' positions corresponding to variable gas-flow rates as known in the art. The 'OPEN' positions allow gas to flow from the inlet 431 to the outlet 432 of the gas valve assembly 430, and thus from the gas-feed pipe 433 to the gas-delivery pipe 434 and finally to the heating element 200, whereas the 'CLOSED' position seals the valve and prevents gas flow therethrough. The 'OPEN' positions range from slightly open to fully open and allow for varying the gas flow rate fed to heating element 200. The gas valve is connected to the stem 440 such that rotation thereof moves the gas valve between the 'CLOSED' position and the 'OPEN' positions. The ignitor switch (see FIG. 4B relating to the first embodiment, which is substantially similar here) is configured such that while rotating the stem 440 of the gas valve from the 'CLOSED' position to an 'OPEN' position, the lobe 414 deflects the second contact 416 into the second position across only a narrow angular window of the 'OPEN' positions, where it contacts the first contact 415 to establish the electrical connection between the power source and the ignitor; and thus to generate a spark and ignite the burner. Because the lobe 414 only deflects the second contact 416 to engage contact 415 in a small angular window, once the stem 440 further rotates outside that window (within the range of 'OPEN' positions for the valve stem 440), the lobe 414 ceases to deflect the second contact 416 whereby its bias results in it returning to the first position. The angular window corresponding to spark-ignition can be just beyond the initial rotation required to move from 'CLOSED' to any 'OPEN' position; or it can be fully at the opposite end of the 'OPEN' window, such that complete rotation of the knob from 'CLOSED' is required to activate the ignitor.

Similarly, the light switch is configured such that when the stem 440 is rotated to any position other than 'CLOSED,' i.e. to any 'OPEN' position within a range of 'OPEN' positions, the lobe 424 deflects the second contact 426 into the second position where it contacts the first contact 425 to establish the electrical connection between the power source and the light sources 471 on the printed circuit board 470. As discussed above, the lobe 424 deflects the second contact 426 into contact with the first contact 425 over a large angular window. This large angular window is configured to correspond to all the 'OPEN' positions of the gas valve, such that when the gas valve is moved to any 'OPEN' position, the electrical connection is established between the contacts 425, 426. This electrical connection results in the illumination of the light sources 471 on the printed circuit board 470. This illumination provides a visual indication discernible at a distance that the heating element 200 is active, such that gas is flowing at all, regardless of the relative power level selected, as described in greater detail below. Returning to FIGS. 6A-6B, in contrast to the first embodiment where the ignitor-switch housing 410 is partially received within the base of upper portion of 422 of the light-switch housing 420, the housings 410 and 420 of the second embodiment are spaced from one another. Such spacing also can contribute to the benefit/utility of the extension provided by the second portion 442 of the valve stem 440 discussed above. In this embodiment the arms 427 extending longitudinally from the top portion 422 will have greater length than in the earlier embodiment in order to accommodate the spacing between the housings 410 and 420 and still provide for assembly and affixation therebetween.

Figure 7A:
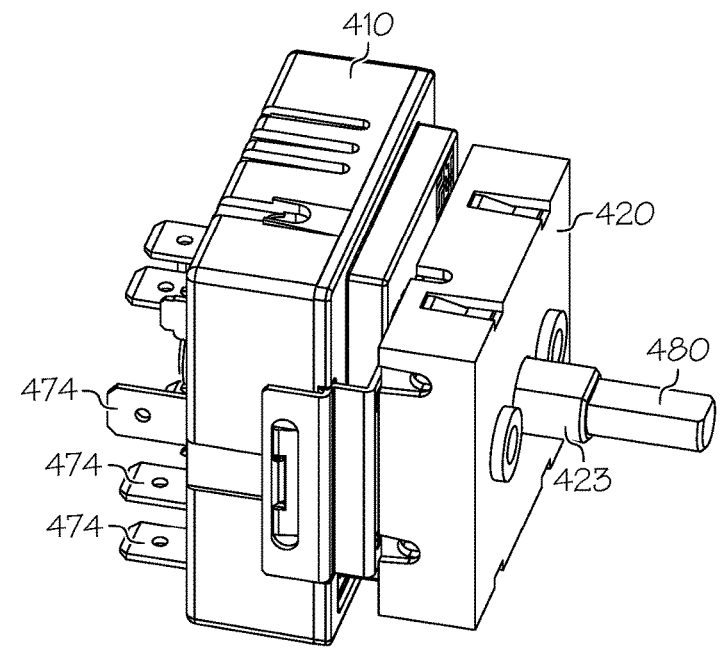
FIG. 7A depicts a knob assembly having a pair of housings according to a third embodiment.
Figure 7B:
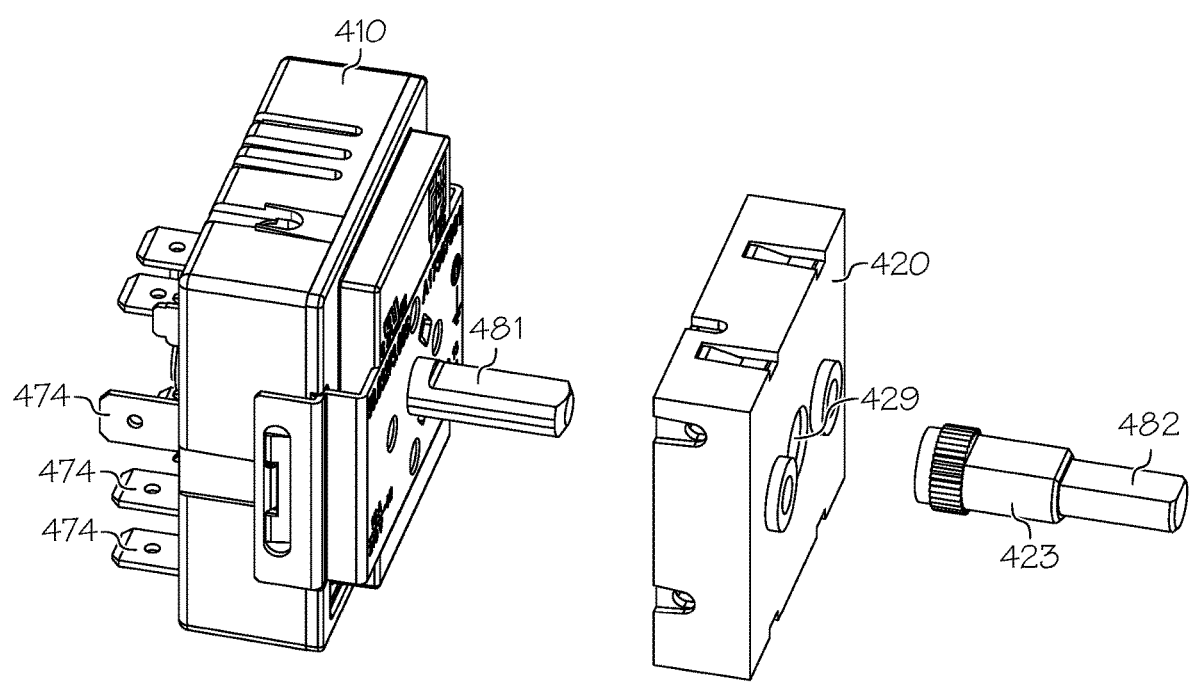
FIG. 7B depicts an exploded view of the knob assembly of FIG. 7A.

Referring to FIGS. 7A-7B, the inner components of a knob assembly 400 according to a third embodiment are shown. This embodiment is adapted to work with an electric heating element 200, and includes an infinite-switch housing as the first housing 410, and a light-switch housing 420 as before. In this embodiment, there is no underlying gas valve. Instead, the infinite-switch housing 410 includes an infinite switch adapted to adjust the power delivered to the electric element 200 (discussed below), and has a switch stem 480 extending therefrom for controlling the magnitude of power to be supplied. In the assembled condition (FIG. 7A) the switch stem 480 extends from the infinite-switch housing 410, through the light-switch housing 420 in a similar manner as already described in earlier embodiments. The switch stem 480 also analogously can includes a first portion 481 extending out of the infinite-switch housing 410 and into the ignitor-switch housing 410, and a second portion 482 attached to the first portion 481 to increase the overall effective length of the switch stem 440. The second portion extends out of a top opening 429 in the light-switch housing 420. As with the components of the stem 440 in the preceding embodiment, the ends of the first portion 481 and second portion 482 of the stem 480 are keyed. The distal end of the first portion 481 is keyed such that it can be received within a socket at the proximal end of the second portion 482. Similarly, the second portion 482 has a distal end that is keyed similarly, preferably the same, as the shape of the first portion 481, so that it can be keyed to cooperating structure (e.g. the cam of the light switch and ultimately the knob that will be affixed above the control panel). In this manner, the second portion 482 acts together with and as an extension of the first portion 481 to actuate the light switch based on user inputs from the knob above.

The infinite-switch housing 410 houses an infinite switch (not shown) which is generally known in the art. Briefly, the infinite switch is connected between a power source via its contacts 474, and the electric heating element 200. Analogous to the ignitor switch of the gas embodiments described above, the infinite switch here is connected to the switch stem 480 such that rotation thereof adjusts the flow of power (as opposed to gas in the prior embodiments) to the heating element 200, thus controlling the relative amount of heat emitted thereby. The light-switch housing 420 is substantially similar to that of the second embodiment described above. The light-switch housing 420 contains a light switch connected to the stem 480. The light switch is configured such that when the stem 440 is rotated such that the heating element 220 is powered to emit heat, the lobe 424 (see FIG. 5B) moves the second contact 426 into the second position where it contacts the first contact 425 to establish the electrical connection between the power source and the light sources 471 on the printed circuit board 470. This electrical connection results in illuminating the light sources 471 to provide a visual indication that the heating element 200 is energized, as described in greater detail below.

Figure 8A:
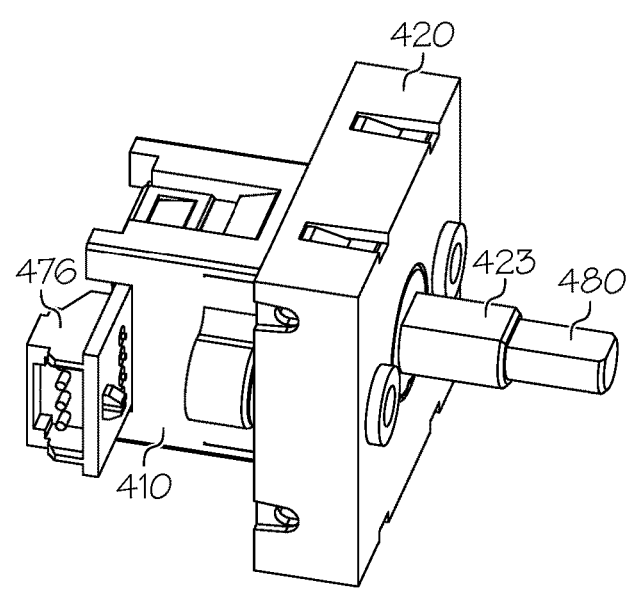
FIG. 8A depicts a knob assembly having a pair of housings according to a fourth embodiment.
Figure 8B:
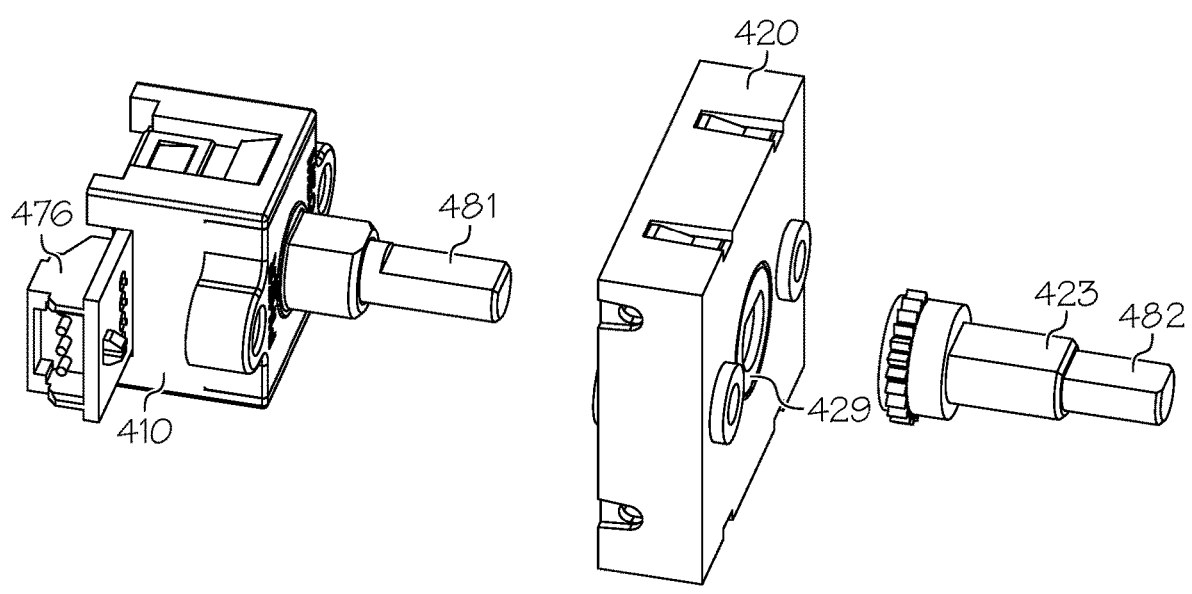
FIG. 8B depicts an exploded view of the knob assembly of FIG. 8A.

Referring to FIGS. 8A-8B, the inner components of a knob assembly 400 according to a fourth embodiment are shown. This embodiment is substantially identical to the third embodiment of the knob assembly discussed above, and also is adapted to work with an electric heating element 200. It includes potentiometer housing 410, a light-switch housing 420, and a switch stem 480 extending from the potentiometer housing 410 through the light-switch housing 420 in the assembled state (FIG. 8A). The potentiometer housing 410 houses a potentiometer (not shown) which is generally known in the art. Briefly, the potentiometer is connected between a power source via a connector 476, as well as the electric heating element 200. Similar to the infinite switch of the third embodiment described above, the potentiometer is connected to the stem 480 such that rotation thereof varies the power output to the heating element 200, thus controlling the relative amount of heat emitted thereby. The light-switch housing 420 is substantially similar to that of the third embodiment described above and is not described again here.

Regardless of the particular embodiment for the inner components of a knob-assembly 400 as disclosed hereinabove, each is actuated from the outside via a user-engageable knob that mounts above the control-panel surface to a terminal portion of the stem 440. In practice, a user grasps and rotates the knob, thus rotating the stem 440 and actuating the associated underlying component (either a gas valve, an infinite switch or a potentiometer), together with all intermediate components keyed to the stem (i.e. ignitor switch and/or light switch) as already discussed.

Referring to FIGS. 9A-9D, the outer components of the knob assembly 400 according to a first embodiment are shown. The knob assembly 400 includes a knob 450 and a bezel 460. The knob 450 includes a base 451 and a handle 452 protruding therefrom. The handle 452 is configured such that a user can easily grasp and rotate the knob 450. The base 451 is partially received in the bezel 460. The handle 452 includes an indicator 453 on the front face thereof formed as an opening or as a transparent or translucent portion to allow light to pass therethrough, as discussed in greater detail below. Extending from the rear side of the handle 452 is boss 454 having an opening 455 configured to receive the distal end of the stem 440 or 480. As with the openings 418, 428 in the cams 413, 423, the opening 455 is keyed such that is rotatably fixed relative to the stem 440 or 480. Specifically, the opening 455 is keyed in the same manner as the second portion 442 or 482 of the stem 440 or 480 such that it can receive the end thereof. Additionally, the opening 455 can receive the end of the first portion 441 or 481 of the stem 440 or 480. This allows the knob assembly 400 to operate without the second housing 420 and the components thereof if desired. A light guide 456 is disposed immediately behind and partially received within a recessed portion 452b of the handle 452. The light guide 456 has a first portion 456a and a second portion 456b, both of which are light transmissive, e.g. translucent or transparent, to allow light to pass therethrough. The first portion 456a has an opening 457a configured to receive the second portion 456b (see FIG. 9D). The second portion 456b has an opening 457b through which the boss 454 extends. The base 451 has an opening 451a that accommodates the light guide 456; e.g. portions 456a, 456b thereof. In the illustrated embodiment, the handle 452 has an affixation hole 459 disposed in a radially-inward protrusion, which in the assembled condition is accommodated through a slots 464a, 464b in the light-guide portions. The base a cooperating affixation hole 451b that when assembled is aligned with the affixation hole 459 in the handle 452, such that a fastener can affix all of the noted components together when axially assembled. The base 451 has a circumferential wall having a gap 451c therein adapted and dimensioned to receive a longitudinally protruding portion 452a of the handle 452. The fitment between the longitudinally protruding portion 452a of the handle 452 and the gap 451c in the base 451 ensures that these components, together with those disposed intermediately, are locked in rotation with one another.

Figure 9A:
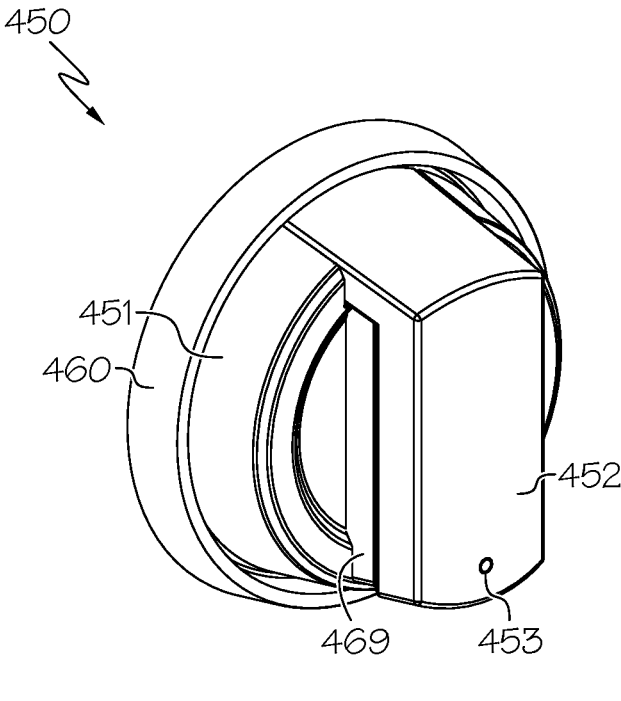
FIG. 9A depicts a knob according to a first embodiment.
Figure 9B:
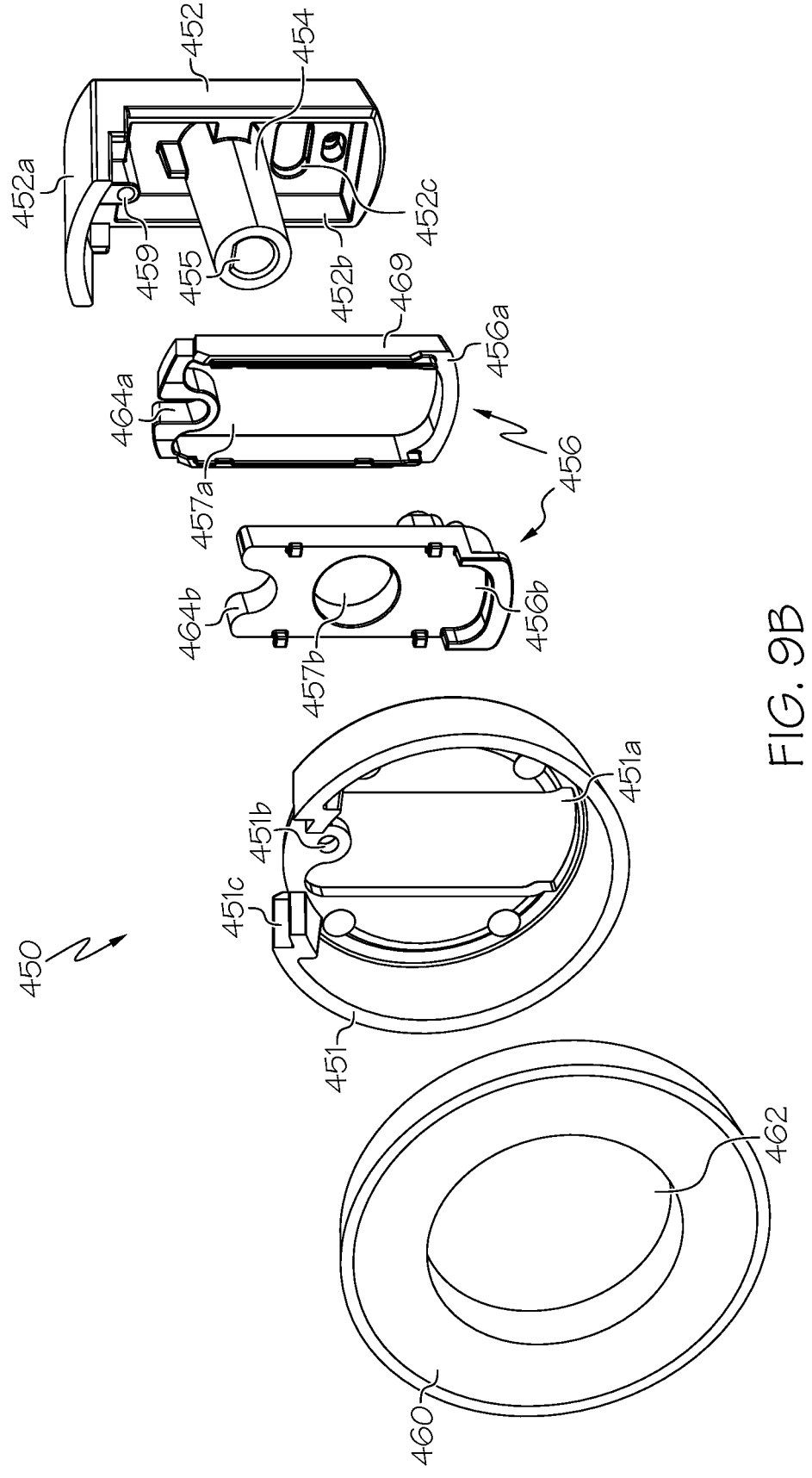
FIG. 9B depicts an exploded view of the knob of FIG. 9A.
Figure 9C:
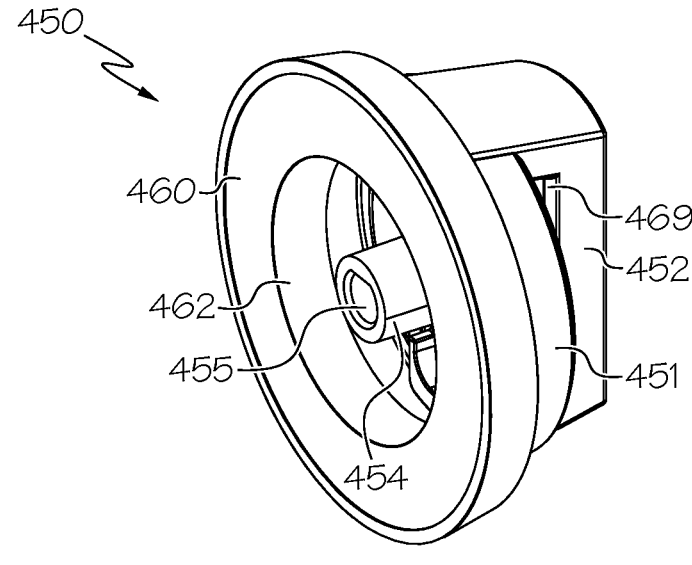
FIG. 9C depicts a rear perspective view of the knob of FIG. 9A.

Referring to FIG. 9C, the bezel 460 has an opening 462 that accommodates passage of the stem 440 so that it can protrude above the bezel and be received within the opening 455 of the boss 454. The bezel 460 is design to obscure view of the stem 440 and inner components of the knob assembly 400 disposed beneath the control panel underneath the bezel.

Figure 9D:
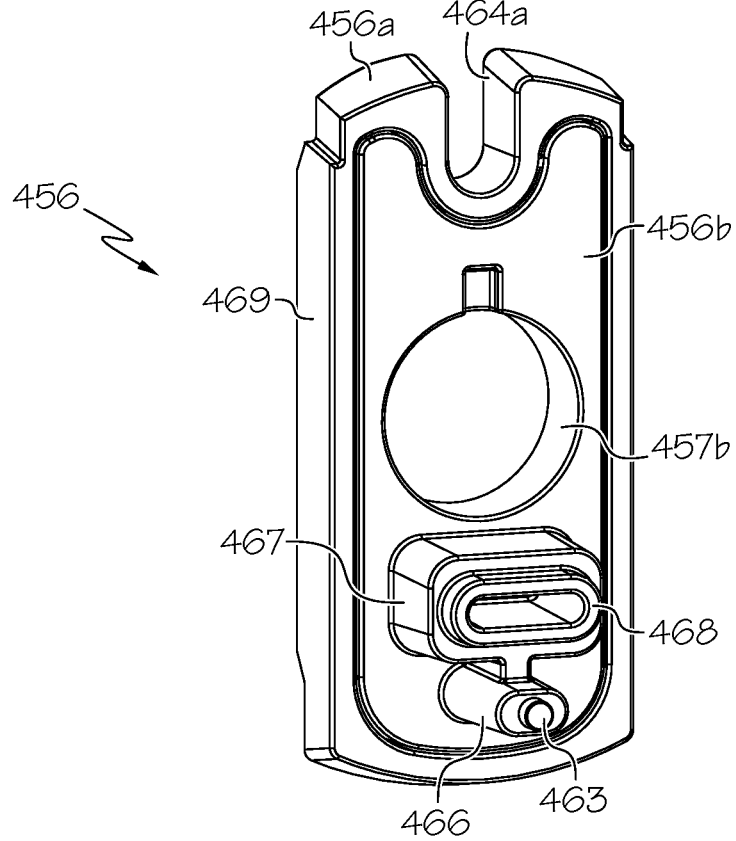
FIG. 9D depicts a light guide of the knob of FIG. 9A.

Turning to FIG. 9D, further details of the light guide portions 456a, 456b are shown. The second portion 456b includes a first protrusion 466 having an indicator boss 463 at the end thereof. The indicator boss 463 is configured to align with a corresponding opening in the face of the handle 452 to provide the aforementioned indicator 453. The second portion 456b further includes a second protrusion 467 having an end portion 468 configured to be received within an opening 452c in the handle 452 (see FIG. 9B). These protrusions 466, 477 ensure the proper alignment of the light guide 456a, 456b within the recessed portion 452b of the handle 452. And because the light guide 456a, 456b is light transmissive, light can pass therethrough such that the indicator 453 in the handle 452 appears illuminated when the light sources 471 are illuminated. This provides a visual indicator as to the status of the heating element 200, because light sources 471 are illuminated when the stem 440 is rotated to any 'ON' position, as explained above. Moreover, one can further discern a relative power-setting of the knob 450 based on the angular position of the indicator 453, for example realizing that top-dead-center is 'OFF,' and that power steadily is increased (or decreased) with increased angular displacement from top-dead-center.

The first portion 456a of the light guide 456 includes an outer periphery 469 that is axially positioned between the base 451 and the handle 452 when assembled, and which like other portions of the light guide will be illuminated when the stem 440 is in any 'ON' position. This provides a relatively large-area region of the knob 450 that will be illuminated to indicate an 'ON' condition, independent of the degree of power (or gas) being supplied by the associated switch (or valve). In operation, a user can grasp the handle 452 of the knob 450 and rotate it from an 'OFF' position to one of a plurality of 'ON' positions in order to activate the corresponding heating element 200. The means for activating the heating element 200, e.g. the gas valve and ignitor switch for a gas burner, or the infinite switch or potentiometer for an electric burner, is activated and adjusted in response to the rotation of the knob 450, and thereby of the associated stem 440. The light switch for activating the light sources 471 also is actuated in response to the rotation of the knob 450 based on its keyed connection (via its cam) to the stem 440. With the light sources 471 illuminated, the light passed through the light transmissive upper surface 422 of the light-switch housing and into the knob 450. The light guide 456a, 456b guides light to the indicator boss 463 thereof to illuminate indicator 453 to provide a lighted indication of the current power setting of the knob (based on its angular position) to the user. Light also passes through the outer periphery 469 of the light guide 456 to be visible to the user. This light allows a user to know the rotational status of knob 450 and thus the operational status of the heating element 200 from a distance.

Figures 10A, 10B, 10C:
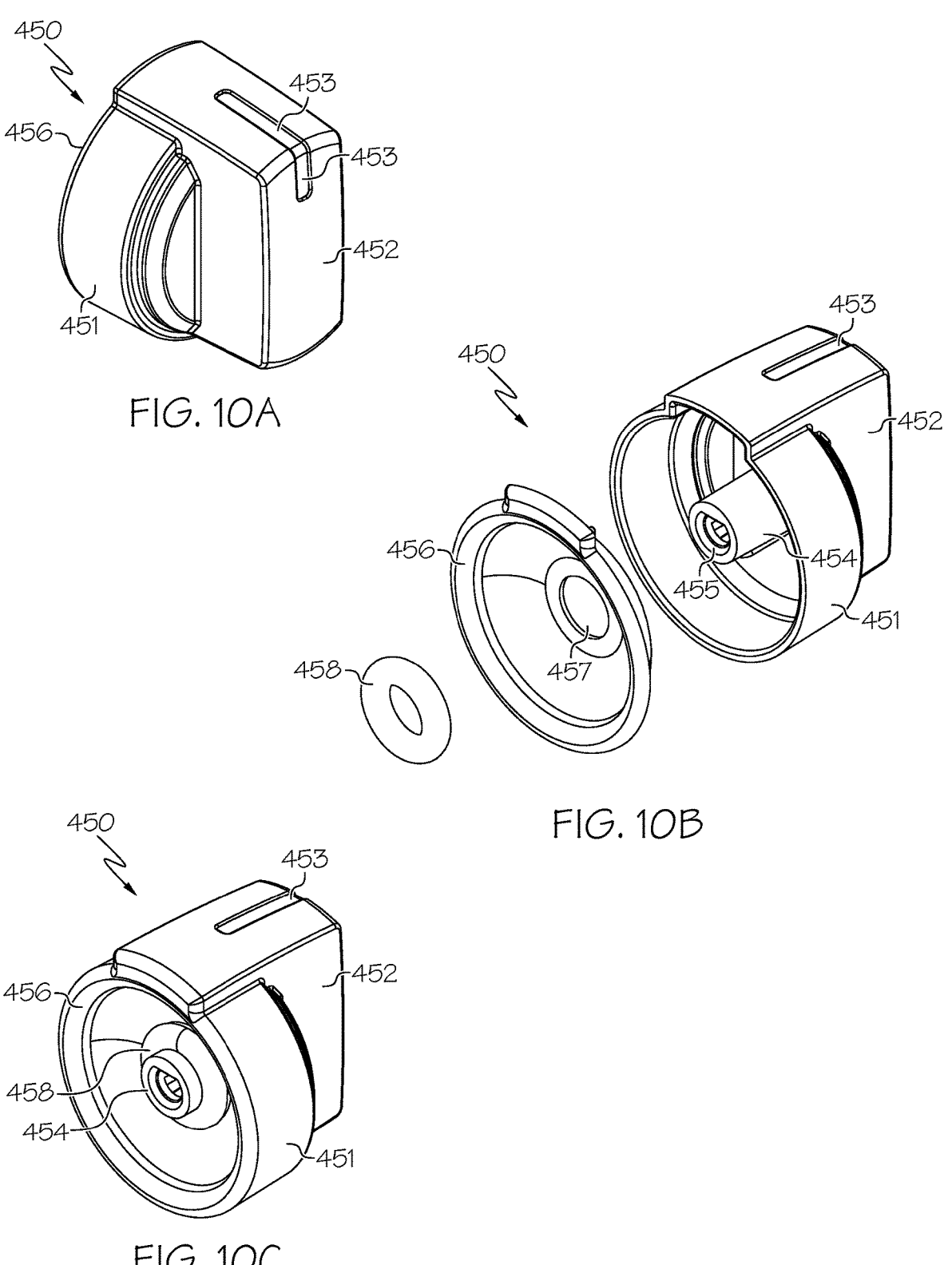
FIG. 10A depicts a knob according to a second embodiment.
FIG. 10B depicts an exploded view of the knob of FIG. 10A.
FIG. 10C depicts a rear perspective view of the knob of FIG. 10A.

Referring to FIGS. 10A-10C, a second embodiment of a knob 450 is shown. Like the knob of the first embodiment, the knob 450 includes a base 451 and a handle 452 extending therefrom. The knob 450 includes an indicator 453 partially on an upper portion of the handle and partially on a front portion of the handle. The indicator 453 can be light transmissive, e.g. transparent or translucent, such that light passing therethrough can serve as a visual indication of the position of the knob 450, and thus the power setting of the heating element 200. Positioned behind the base of the knob is a light guide 456 that also can be light transmissive, e.g. transparent or translucent, such that light can pass to the indicator 453 and such that the area of the control panel 300 around the periphery of the knob 450 is illuminated (i.e. in a halo surrounding the light guide 456). Referring to FIG. 10B, the knob is generally hollow such that light can pass therethrough. The knob 450 includes a boss 454 having an opening 455 similar to the embodiment described above that is configured to receive the stem 440 or 480. The light guide 456 has an opening 457 in the center thereof that the boss 454 of the knob 450 extends through. A gasket 458 also extends over the boss 454 of the knob 450 to secure the light guide 456 in place (see FIG. 10C).

Figures 11A, 11B:
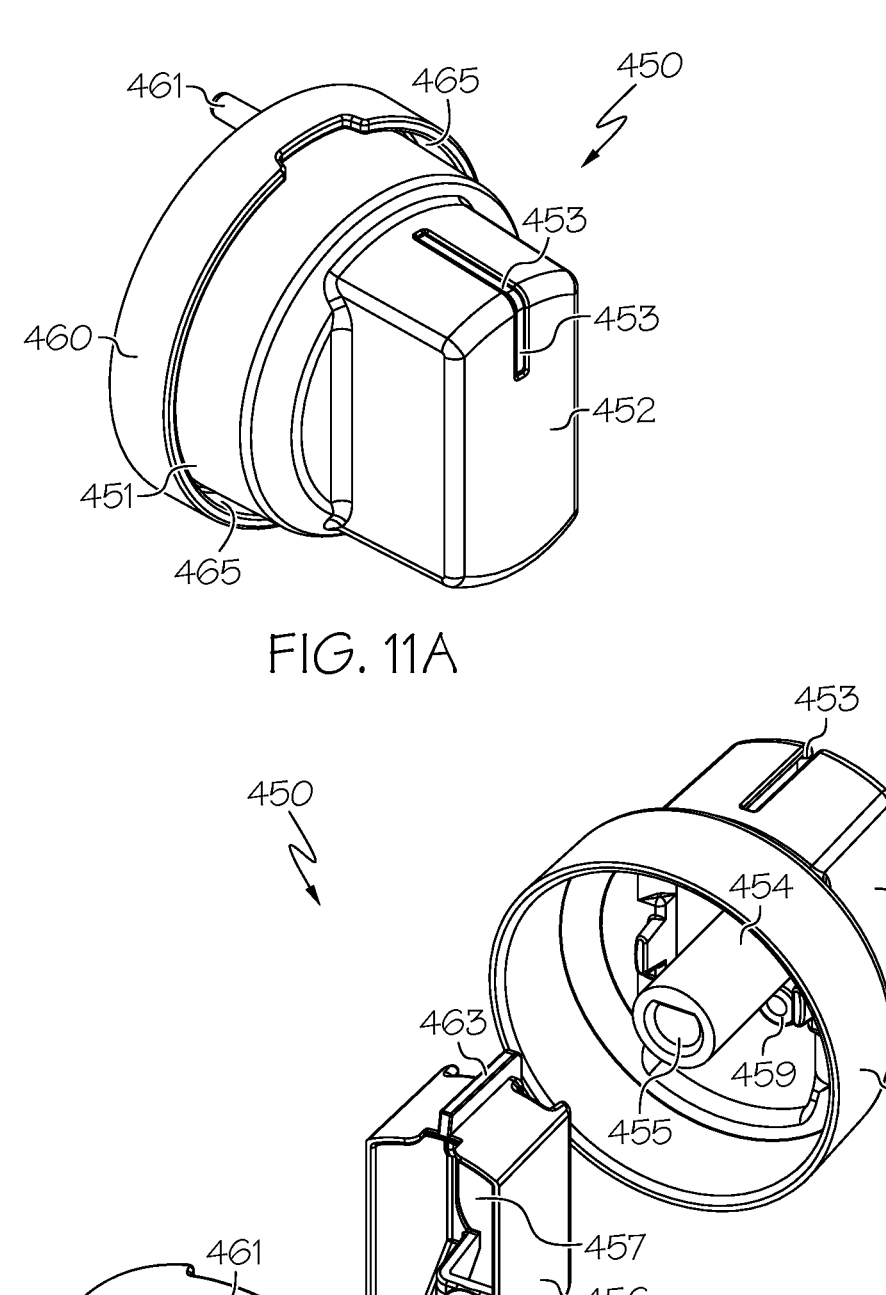
FIG. 11A depicts a knob according to a third embodiment.
FIG. 11B depicts an exploded view of the knob of FIG. 11A.
Figure 11C:
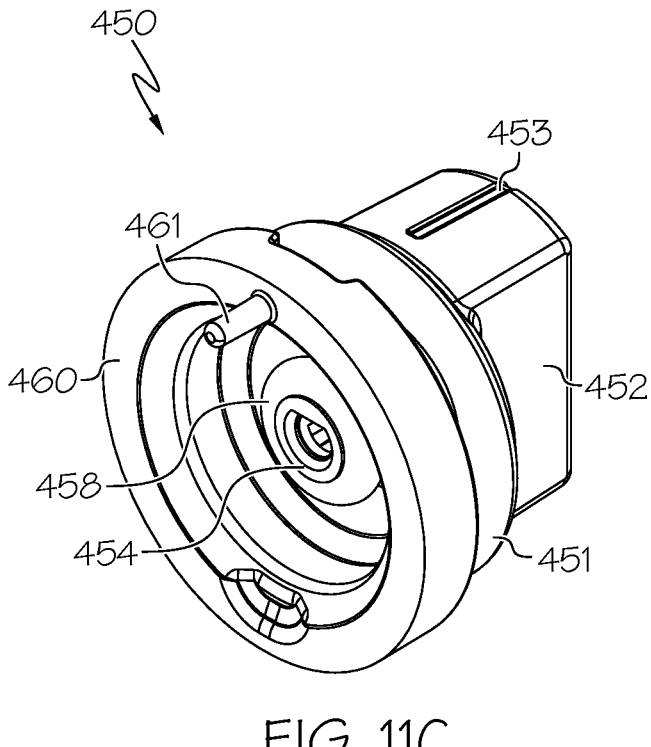
FIG. 11C depicts a rear perspective view of the knob of FIG. 11A.

Referring to FIGS. 11A-11C, a third embodiment of a knob 450 is shown. Like the knob of the other embodiment the knob 450 here includes a base 451 and a handle 452 extending therefrom. The knob also includes a slotted opening 453 partially on an upper portion of the handle 452 and partially on a front portion thereof. An indictor portion 463 of a light pipe 456, discussed in detail below, extends through the slotted opening 453. The indicator 463 portion of the light pipe 456 serves the same function as the indicator boss of the first knob embodiment discussed above. Positioned behind the knob 450, and partially surrounding the outer periphery of the base 451, is a bezel 460. The bezel 460 and the base 451 define a gap 465 through which light can be visible to serve as further indication that the knob is in an 'ON' position, such that the heating element 200 is energized or active. Referring to FIG. 11B, the knob is generally hollow such that light can pass therethrough. The knob 450 includes a boss 454 having an opening 455 configured to receive the stem 440 or 480. The light pipe 456 is also depicted in FIG. 11B and has an opening 457 such that it can be positioned within the inside of the handle 452 with the boss 454 passing through the opening 457. The handle 452 includes a hole 459, with the light pipe 456 having a corresponding hole 464. A fastener, e.g. a threaded fastener such as a screw (not shown), can extend through both holes 459, 464 to secure the light pipe 456 inside the handle 452. The bezel 460 includes an opening 462 through which the boss 454 extends. A gasket 458 also extends over the boss 454 to secure the bezel 460 to the knob 450 (see FIG. 11C). The bezel 460 further includes a protrusion 461 to be received within an opening (not shown) in the control panel 300 such that bezel 460 is fixed in place, e.g. does not rotate, with the knob 450.

Numerous embodiments have been described herein. It will be apparent to those skilled in the art that the above methods, architecture, and apparatuses may incorporate changes and modifications without departing from the general scope of this invention. It is intended to include all such modifications and alterations as far as they come within the scope of the appended claims or the equivalents thereof. The right to claim elements and/or sub-combinations that are disclosed herein as other inventions in other patent documents is hereby unconditionally reserved.

The invention claimed is:

1. A knob assembly comprising: a user-engageable knob having a light guide; a first housing enclosing a first switch adapted to operate a heating element for cooking food and a second housing enclosing a light switch and a light source, the light switch adapted to operate the light source to illuminate the knob; and a rotatable stem operatively coupled to each of said first switch, said light switch and said knob, such that rotation of said knob is adapted to operate the first switch and the light switch; said first housing being longitudinally stacked behind and attached to a distal end of said second housing, such that said stem extends at least partially through said first housing and through said second housing; said knob being affixed to an end of said stem protruding forward of a proximal end of said second housing.

2. The knob assembly of claim 1, further comprising a gas valve disposed longitudinally behind said first housing, said stem being a valve stem operable to adjust a flow of gas through said valve for delivery to said heating element, said valve stem extending from said valve through said first housing and through said second housing.

3. The knob assembly of claim 2, said heating element being a gas heating element, said first switch being an ignitor switch comprising an ignitor cam that is keyed to and rotates with said valve stem, said ignitor cam having a lobe that deflects a first ignitor-switch contact to close a circuit with a second ignitor-switch contact in order to deliver power to an ignitor for igniting the flow of gas at said gas heating element when said knob is rotated to an ignition position.

4. The knob assembly of claim 3, said light switch comprising a lighting cam that is keyed to and rotates with said valve stem, said lighting cam having a lobe that deflects a first light-switch contact to close a circuit with a second light-switch contact in order to energize said light source to illuminate said light guide of said knob whenever said knob is rotated out of an off position.

5. The knob assembly of claim 1, the light guide configured to receive light emitted by the light source and to transmit the received light so that it is viewable at an external portion of the knob.

6. The knob assembly of claim 5, the light guide configured to guide light to an indicator on a front portion of the knob, the indicator configured to be illuminated by the light source.

7. The knob assembly of claim 5, the light guide configured to guide light to an outer periphery of the knob or a portion thereof such that the outer periphery is configured to be illuminated by the light source.

8. The knob assembly of claim 1, the stem including a first portion extending from or through the first housing, and a second portion connected to the first portion and extending through the second housing.

9. The knob assembly of claim 8, said second portion of said stem having an end shaped to be received and rotationally fixed in an opening in said knob.

10. The knob assembly of claim 8, said first portion of said stem having an end of the same shape as the end of said second portion.

11. The knob assembly of claim 1, said heating element being an electric heating element, said first switch being an electric infinite switch or a potentiometer, said stem being a switch stem extending from said infinite switch or potentiometer and being rotatable to adjust a flow of electrical current therethrough to said electric heating element, when said knob is rotated from an off position.

12. The knob assembly of claim 11, said light switch comprising a lighting cam that is keyed to and rotates with said switch stem, said lighting cam having a lobe that deflects a first light-switch contact to close a circuit with a second light-switch contact in order to energize said light source to illuminate said light guide of said knob whenever said knob is rotated out of said off position.

13. The knob assembly of claim 1, the second housing having a light transmissive upper surface such that light emitted by the light source can pass therethrough.

14. The knob assembly of claim 1, wherein the light guide is secured to or within the knob.

15. A knob assembly comprising: a user-engageable knob having a light guide; a first housing enclosing a first switch adapted to operate a heating element for cooking food and a second housing enclosing a light switch and a light source, the light switch adapted to operate the light source to illuminate the knob; and a rotatable stem configured to operatively engage each of said first switch and said light switch; said first housing being attached to a distal end of said second housing, such that said stem extends at least partially through said first housing and through said second housing; said knob being affixed to an end of said stem protruding forward of a proximal end of said second housing.

16. The knob assembly of claim 15, wherein said second housing fully encloses the light switch.

17. The knob assembly of claim 15, said first housing being longitudinally stacked behind said second housing.

* * * * *